United States Patent
Vasquez et al.

(10) Patent No.: US 9,371,925 B2
(45) Date of Patent: Jun. 21, 2016

(54) FLUID REGULATORS HAVING CORRUGATED DIAPHRAGMS

(71) Applicant: Tescom Corporation, Elk River, MN (US)

(72) Inventors: Ernesto Vasquez, McKinney, TX (US); James Lyman Griffin, Jr., McKinney, TX (US); Andrew Jared Lukensmeyer, McKinney, TX (US); Tony Alan Durant, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 50 days.

(21) Appl. No.: 13/954,527

(22) Filed: Jul. 30, 2013

(65) Prior Publication Data

US 2015/0034178 A1 Feb. 5, 2015

(51) Int. Cl.
*F16K 31/12* (2006.01)
*F16K 17/04* (2006.01)
*G05D 16/06* (2006.01)

(52) U.S. Cl.
CPC ............ *F16K 17/04* (2013.01); *G05D 16/0633* (2013.01); *Y10T 137/774* (2015.04)

(58) Field of Classification Search
CPC ........ F16J 3/02; G01L 7/082; F16K 31/1268; F16K 31/12; G05D 16/0633; F01B 19/00; Y10T 137/774
USPC .............. 137/494, 496, 505; 251/331; 92/96, 92/98 R, 102, 104
See application file for complete search history.

(56) References Cited

U.S. PATENT DOCUMENTS

| 330,263 | A | | 11/1885 | Robertson | |
|---|---|---|---|---|---|
| 466,275 | A | | 12/1891 | Fasoldt | |
| 1,045,791 | A | * | 11/1912 | Hodge | ........................ 236/26 C |
| 1,286,397 | A | | 12/1918 | Olsen | |
| 1,452,252 | A | | 4/1923 | Muller | |
| 1,543,264 | A | * | 6/1925 | Morgan | ..................... 137/505.3 |
| 1,891,547 | A | | 12/1932 | Krichbaum | |

(Continued)

FOREIGN PATENT DOCUMENTS

DE 202004006191 8/2004
EP 0192625 8/1986

(Continued)

OTHER PUBLICATIONS

International Searching Authority, "International Preliminary Report on Patentability," issued in connection with International Patent Application No. PCT/US2010/034798, issued on Jan. 4, 2012, 6 pages.

(Continued)

*Primary Examiner* — Jessica Cahill
(74) *Attorney, Agent, or Firm* — Hanley, Flight & Zimmerman, LLC

(57) ABSTRACT

Corrugated diaphragm apparatus for improved cycle life of a diaphragm are described herein. One described example apparatus includes a valve body having an inlet and an outlet to allow fluid to flow therethrough, a backing plate disposed within a bonnet and coupled to the valve body, and first and second diaphragms. Each diaphragm has a corrugated profile and is in a stacked configuration. The diaphragms are operatively coupled to the backing plate and each of the diaphragms is clamped between the valve body and the bonnet proximate a peripheral edge of the diaphragm.

28 Claims, 8 Drawing Sheets

(56) References Cited

U.S. PATENT DOCUMENTS

| | | | |
|---|---|---|---|
| 2,082,227 A | 6/1937 | Stettner | |
| 2,348,388 A | 5/1944 | Jenkins | |
| 2,521,637 A | 9/1950 | Lack | |
| 2,612,728 A | 10/1952 | Jacobsson | |
| 2,664,674 A | 1/1954 | Niesemann | |
| 2,667,127 A | 1/1954 | Rimann | |
| 2,707,966 A | 5/1955 | Taplin | |
| 2,806,481 A | 9/1957 | Faust | |
| 2,894,526 A | 7/1959 | Booth et al. | |
| 2,918,081 A | 12/1959 | Lauer, Jr. | |
| 2,942,624 A | 6/1960 | Good | |
| 3,113,756 A | 12/1963 | Griffo | |
| 3,120,377 A | 2/1964 | Lipschultz et al. | |
| 3,387,622 A | 6/1968 | Weinstein | |
| 3,434,395 A * | 3/1969 | Londal | 92/6 R |
| 3,503,307 A | 3/1970 | Midgal | |
| 3,586,037 A | 6/1971 | Zimmer | |
| 3,667,722 A | 6/1972 | Katz et al. | |
| 3,819,286 A | 6/1974 | Bianchi | |
| 4,055,198 A | 10/1977 | Iannelli | |
| 4,196,744 A | 4/1980 | Bradshaw | |
| 4,457,329 A | 7/1984 | Werley et al. | |
| 4,471,802 A | 9/1984 | Pryor | |
| 4,543,832 A | 10/1985 | Van Over | |
| 4,624,442 A | 11/1986 | Duffy et al. | |
| 4,741,252 A * | 5/1988 | Harter et al. | 92/103 SD |
| 5,292,024 A | 3/1994 | Koefelda et al. | |
| 5,335,584 A * | 8/1994 | Baird | 92/98 R |
| 5,443,083 A | 8/1995 | Gotthelf | |
| 5,449,003 A | 9/1995 | Sugimura | |
| 5,567,130 A | 10/1996 | Kvinge et al. | |
| 5,586,569 A | 12/1996 | Hanning et al. | |
| 5,615,701 A * | 4/1997 | Yamabe | E03F 1/006 137/205 |
| 5,725,007 A | 3/1998 | Stubbs | |
| 5,755,254 A | 5/1998 | Carter et al. | |
| 5,829,477 A | 11/1998 | Graham et al. | |
| 5,901,742 A | 5/1999 | Kleppner et al. | |
| 5,904,178 A | 5/1999 | Bracey et al. | |
| 5,950,652 A | 9/1999 | Morgan | |
| 5,950,692 A | 9/1999 | Georgs et al. | |
| 6,003,545 A | 12/1999 | Dukas et al. | |
| 6,019,121 A | 2/2000 | Uehara | |
| 6,039,071 A * | 3/2000 | Tomita et al. | 137/505.37 |
| 6,276,907 B1 * | 8/2001 | Cooper et al. | 417/395 |
| 6,536,466 B1 | 3/2003 | Rockwell | |
| 7,357,143 B2 | 4/2008 | Cho et al. | |
| 8,408,418 B2 | 4/2013 | Kuzelka | |
| 8,459,297 B2 | 6/2013 | Clifford | |
| 2005/0116427 A1 * | 6/2005 | Seidel et al. | 277/610 |
| 2006/0169328 A1 | 8/2006 | Cho et al. | |
| 2006/0289824 A1 | 12/2006 | Wincek | |
| 2009/0065073 A1 | 3/2009 | Davis | |
| 2009/0301582 A1 | 12/2009 | Wakeman | |
| 2009/0314359 A1 | 12/2009 | Woelfges | |
| 2011/0000553 A1 | 1/2011 | Clifford | |
| 2011/0174395 A1 | 7/2011 | Clifford et al. | |
| 2011/0174398 A1 | 7/2011 | Clifford et al. | |
| 2012/0241033 A1 | 9/2012 | Clifford et al. | |
| 2014/0034155 A1 | 2/2014 | Askew | |

FOREIGN PATENT DOCUMENTS

| | | | |
|---|---|---|---|
| EP | 0716230 | | 6/1996 |
| EP | 0727603 | | 8/1996 |
| FR | 2878985 | | 6/2006 |
| GB | 335044 | | 9/1930 |
| GB | 451379 | | 8/1936 |
| GB | 521273 | * | 5/1940 |
| GB | 834574 | | 5/1960 |
| GB | 1230715 | | 5/1971 |
| GB | 2125938 | | 3/1984 |
| GB | 2222869 | | 3/1990 |
| GB | 2464283 | | 4/2010 |
| WO | 9810208 | | 3/1998 |
| WO | 2011002559 | | 1/2011 |

OTHER PUBLICATIONS

United States Patent and Trademark Office, "Advisory Action," issued in connection with U.S. Appl. No. 13/052,451, mailed on Jun. 13, 2014, 4 pages.

United States Patent and Trademark Office, "Final Office Action," issued in connection with U.S. Appl. No. 13/052,475, mailed on Jul. 25, 2014, 25 pages.

United States Patent and Trademark Office, "Final Office Action," issued in connection with U.S. Appl. No. 13/052,470, mailed on Jul. 25, 2014, 28 pages.

United States Patent and Trademark Office, "Office Action," issued in connection with U.S. Appl. No. 13/052,451, mailed on Jul. 24, 2014, 22 pages.

International Searching Authority, "International Search Report," issued in connection with international application serial No. PCT/US2012/025536, mailed May 22, 2012, 3 pages.

International Searching Authority, "Written Opinion of the International Searching Authority," issued in connection with international application serial No. PCT/US2012/025536, mailed May 22, 2012, 7 pages.

United States Patent and Trademark Office, "Final Office Action," issued in connection with U.S. Appl. No. 13/052,451, mailed on Dec. 30, 2013, 17 pages.

United States Patent and Trademark Office, "Final Office Action," issued in connection with U.S. Appl. No. 13/052,470, mailed on Nov. 7, 2013, 17 pages.

United States Patent and Trademark Office, "Final Office Action," issued in connection with U.S. Appl. No. 13/052,475, mailed on Nov. 5, 2013, 23 pages.

United States Patent and Trademark Office, "Office Action," issued in connection with U.S. Appl. No. 13/052,451, mailed on Jul. 23, 2013, 26 pages.

United States Patent and Trademark Office, "Office Action," issued in connection with U.S. Appl. No. 13/052,470, mailed on Jun. 26, 2013, 24 pages.

United States Patent and Trademark Office, "Requirement for Restriction/Election," issued in connection with U.S. Appl. No. 13/052,451, mailed on Jun. 12, 2013, 6 pages.

United States Patent and Trademark Office, "Office Action," issued in connection with U.S. Appl. No. 13/052,475, mailed on May 28, 2013, 25 pages.

United States Patent and Trademark Office, "Requirement for Restriction/Election," issued in connection with U.S. Appl. No. 13/052,470, mailed on May 13, 2013, 9 pages.

United States Patent and Trademark Office, "Final Office Action," issued in connection with U.S. Appl. No. 13/052,451, mailed on Apr. 3, 2014, 14 pages.

United States Patent and Trademark Office, "Requirement for Restriction/Election," issued in connection with U.S. Appl. No. 12/496,868, mailed on Jan. 6, 2012, 7 pages.

United States Patent and Trademark Office, "Office Action," issued in connection with U.S. Appl. No. 12/496,868, mailed on Feb. 27, 2012, 21 pages.

United States Patent and Trademark Office, "Final Office Action," issued in connection with U.S. Appl. No. 12/496,868, mailed on Jul. 5, 2012, 17 pages.

United States Patent and Trademark Office, "Notice of Allowance," issued in connection with U.S. Appl. No. 12/496,868, mailed on Feb. 27, 2013, 13 pages.

International Searching Authority, "International Search Report," issued in connection with International patent application No. PCT/US2010/034798, mailed on Oct. 31, 2011, 4 pages.

International Searching Authority, "Written Opinion of the International Search Authority," issued in connection with International patent application No. PCT/US2010/034798, issued on Oct. 31, 2011, 5 pages.

(56) References Cited

OTHER PUBLICATIONS

United States Patent and Trademark Office, "Office Action," issued in connection with U.S. Appl. No. 13/052,470, mailed on Mar. 6, 2014, 26 pages.
United States Patent and Trademark Office, "Office Action," issued in connection with U.S. Appl. No. 13/052,475, mailed on Mar. 10, 2014, 25 pages.
TESCOM, "44-1100 Series," Specifications, May 2007, 2 pages.
TESCOM, "44-1300 Series," Specifications, Jun. 2006, 2 pages.
TESCOM, "44-2200 Series," Specifications, Nov. 2010, 2 pages.
Emerson Process Management, "Type 95H," Fisher, Jan. 2007, 1 page.
International Searching Authority, "International Search Report," issued in connection with international application serial No. PCT/US2012/026099, issued May 11, 2012, 2 pages.
International Searching Authority, "Written Opinion of the International Searching Authority," issued in connection with international application serial No. PCT/US2012/026099, issued May 11, 2012, 6 pages.
United States Patent and Trademark Office, "Final Office Action," issued in connection with U.S. Appl. No. 13/052,451, mailed on Dec. 22, 2014, 16 pages.
European Patent Office, "Communication Pursuant to Article 94(3) EPC," issued in connection with European Patent Application No. 12706975.5, mailed on Nov. 4, 2014, 7 pages.
European Patent Office, "Communication Pursuant to Article 94(3) EPC," issued in connection with European Patent Application No. 12706976.3, mailed on Nov. 10, 2014, 7 pages.
United States Patent and Trademark Office, "Office Action," issued in connection with U.S. Appl. No. 13/052,470, mailed on Nov. 3, 2014, 25 pages.
United States Patent and Trademark Office, "Advisory Action," issued in connection with U.S. Appl. No. 13/052,475, mailed on Nov. 14, 2014, 3 pages.
International Searching Authority, "International Search Report," issued in connection with PCT Patent Application Serial No. PCT/US2014/049030, mailed on Oct. 21, 2014, 3 pages.
International Searching Authority, "Written Opinion of the International Searching Authority," issued in connection with PCT Patent Application Serial No. PCT/US2014/049030, mailed on Oct. 21, 2014, 5 pages.
United States Patent and Trademark Office, "Final Office Action," issued in connection with U.S. Appl. No. 13/052,470, mailed on Apr. 29, 2015, 24 pages.
United States Patent and Trademark Office, "Advisory Action," issued in connection with U.S. Appl. No. 13/052,451, mailed on Mar. 12, 2015, 3 pages.
United States Patent and Trademark Office, "Non-Final Office Action," issued in connection with U.S. Appl. No. 14/195,450, mailed on Aug. 11, 2015, 39 pages.
United States Patent and Trademark Office, "Final Office Action", issued in connection with U.S. Appl. No. 14/195,450, mailed on Dec. 18, 2015, 19 pages.
Patent Cooperation Treaty, "Invitation to Pay Additional Fees", issued in connection with PCT Application No. PCT/US2015/032919, mailed on Sep. 11, 2015, 4 pages.
United States Patent and Trademark Office, "Notice of Allowance", issued in connection with U.S. Appl. No. 14/195,450, mailed on Feb. 1, 2016, 11 pages.
Patent Cooperation Treaty, "International Preliminary Report on Patentability", issued in connection with PCT Application No. PCT/US2014/049030, issued Feb. 2, 2016, 7 pages.
Patent Cooperation Treaty, "International Search Report," issued in connection with PCT Patent Application Nb. PCT/US2015/032919, mailed on May 10, 2016, 8 pages.
Patent Cooperation Treaty, "Written Opinion," issued in connection with PCT Patent Application No. PCT/ JS2015/032919, mailed on May 10, 2016, 10 pages.

\* cited by examiner

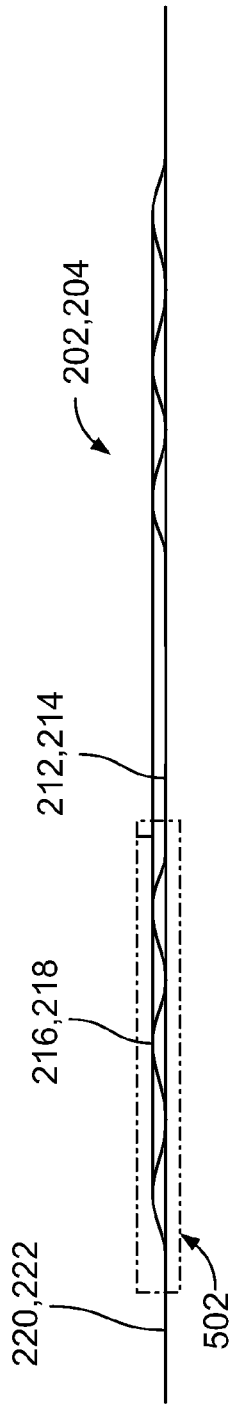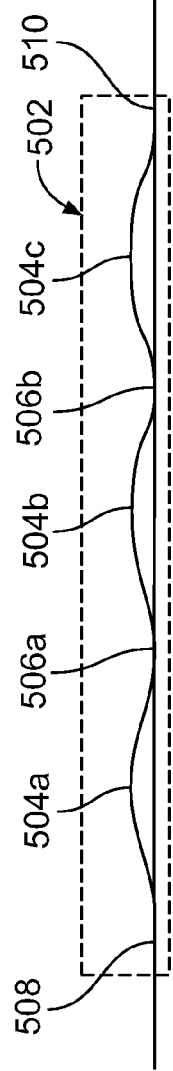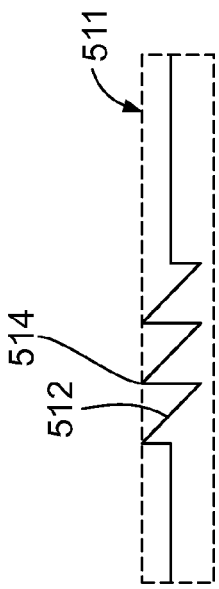

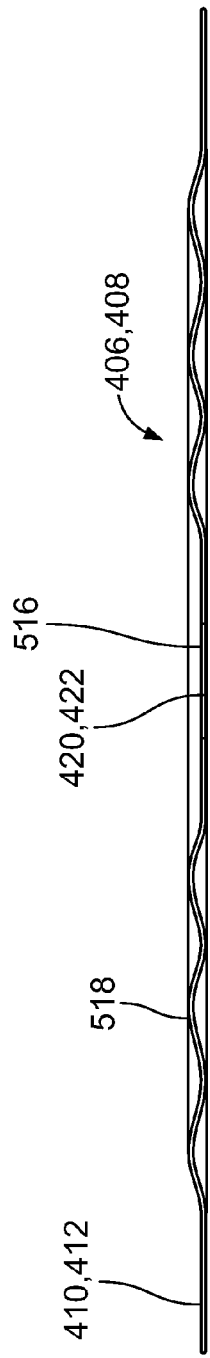
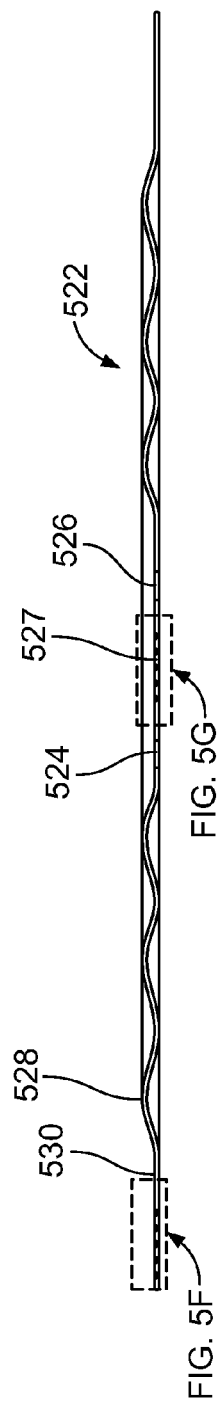

FLUID REGULATORS HAVING CORRUGATED DIAPHRAGMS

FIELD OF THE DISCLOSURE

This patent relates generally to fluid regulators and, more particularly, to fluid regulators having corrugated diaphragms.

BACKGROUND

Fluid regulators are commonly distributed throughout process control systems to control flow rates and/or pressures of various fluids (e.g. liquids, gases, etc.). Fluid regulators are commonly used to regulate the pressure of a fluid to a substantially constant value. In particular, a fluid regulator has an inlet and an outlet, either of which may supply the fluid that contacts a sensing element or a diaphragm within the regulator. In the case of a diaphragm fluid regulator, the fluid that contacts the diaphragm causes the diaphragm to displace to move a sealing element, which affects the amount of fluid flowing between the inlet and outlet.

Typically, a diaphragm within a fluid regulator is clamped at its peripheral edge between a bonnet and a valve body of the fluid regulator. Such a clamped connection at the periphery of the diaphragm can cause stress concentrations in the diaphragm. These stress concentrations can lead to premature failure or fatigue of the diaphragm and/or the diaphragm being pulled out of its peripheral constraints, thereby reducing the cycle life of the diaphragm and causing increased maintenance and costs.

SUMMARY

One described example apparatus includes a valve body having an inlet and an outlet to allow fluid to flow therethrough, a backing plate disposed within a bonnet and coupled to the valve body, and first and second diaphragms. Each diaphragm has a corrugated profile and is in a stacked configuration. The diaphragms are operatively coupled to the backing plate and each of the diaphragms is clamped between the valve body and the bonnet proximate a peripheral edge of the diaphragm.

Another described example apparatus includes a valve body having an inlet and an outlet allowing fluid to flow therethrough, a fluid chamber disposed within the valve body, a plurality of diaphragms in a stacked configuration adjacent to the fluid chamber, each diaphragm has a corrugated profile. A first diaphragm is operatively coupled to a backing plate and a second diaphragm is operatively coupled to a valve stem. The apparatus also includes a bonnet containing the backing plate. The diaphragms are clamped between the valve body and the bonnet.

Another described example apparatus includes a plurality of diaphragms, each having a corrugated profile and in a stacked configuration. The diaphragms are constrained at their peripheral edges and adjacent to a fluid chamber. The apparatus also includes a valve stem operatively coupled to the diaphragms through apertures of the diaphragms.

BRIEF DESCRIPTION OF THE DRAWINGS

FIG. 5A is a cross-sectional view of the corrugated diaphragm of the example fluid regulator of FIGS. 2 and 3.
FIG. 5B is an enlarged cross-sectional view of a portion of the corrugated diaphragm of FIG. 5A.
FIG. 5C is another enlarged cross-sectional view of an alternative portion of the corrugation that may be used to implement the diaphragm of FIG. 5A.
FIG. 5D is a cross-sectional view of the corrugated diaphragm of the example fluid regulator of FIG. 4.
FIG. 5E is a cross-sectional view of another example corrugated diaphragm.
FIG. 5F is an enlarged cross-sectional view of a portion of the corrugated diaphragm of FIG. 5E.
FIG. 5G is an enlarged cross-sectional view of another portion of the corrugated diaphragm of FIG. 5E.

DETAILED DESCRIPTION

Figure 1:
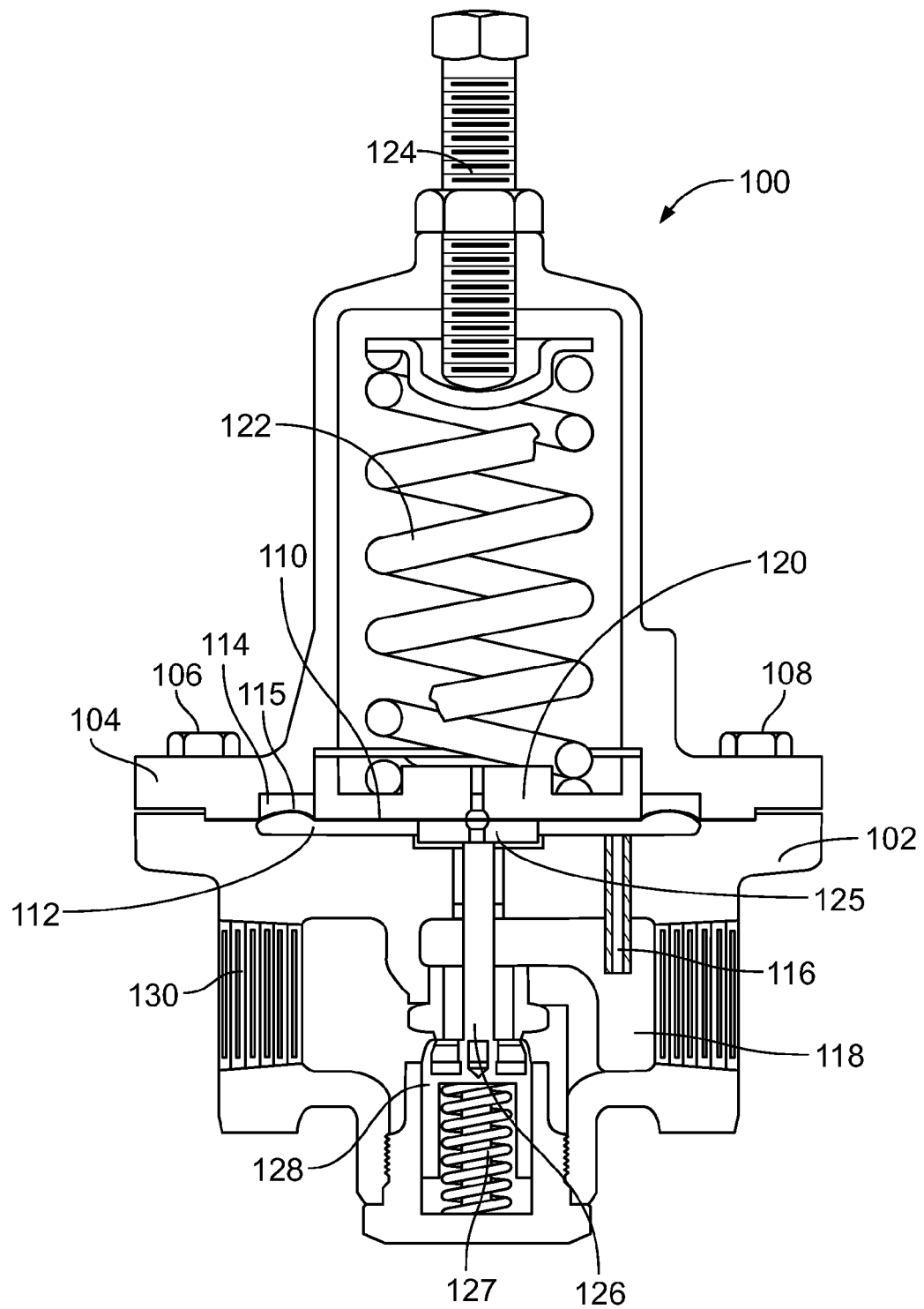
FIG. 1 shows a known fluid regulator.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

Many known fluid regulators employ a diaphragm that interacts with a fluid in a sensing chamber. The fluid may displace the diaphragm which, in turn, displaces a valve stem. This displacement of the valve stem causes a sealing poppet, which is fixed to the valve stem, to displace, thereby altering the fluid flow and/or the pressure differential between an inlet and an outlet of the fluid regulator. Numerous cycles of diaphragm displacement may cause premature failure or cyclical loading failure (e.g., fatigue) due to stress concentrations. The geometry of the diaphragm and the manner in which the diaphragm is constrained (e.g., clamped) can have a significant impact on the stress concentrations occurring in the diaphragm. Additionally, the diaphragm or a portion of the diaphragm may eventually pull out of the constraints (e.g., become unclamped) at its periphery, resulting in performance degradation or loss of the fluid regulator's primary function.

In accordance with the teachings of this disclosure, the example fluid regulators described herein may implement a multiple diaphragm arrangement that interacts with fluid in a sensing chamber. More specifically, the example fluid regulators may utilize multiple diaphragms, each having a corrugated profile and in a stacked arrangement to substantially improve the distribution of stresses experienced by the diaphragms. In particular, the stacking of diaphragms having a corrugated profile substantially reduces tangential stresses experienced in the diaphragms. The reduction of these and other stresses results in greater overall reliability of the fluid regulator and reduced related repair costs.

In some examples described herein, the diaphragms have a central aperture in which a valve stem can be rigidly constrained to increase the accuracy of the movement of the valve stem. Additionally, some of the examples described herein include structures to increase the friction between the surfaces involved in clamping the diaphragms. This improves overall reliability of the fluid regulator by preventing the diaphragms from pulling out of a clamped joint. In particular, the structures constraining the diaphragms such as clamping surfaces of a valve body and/or a bonnet may include serrations or other irregularities on the clamping surfaces that contact the peripheral edges of the diaphragms to increase clamping friction. The increased friction may prevent the diaphragms from being disengaged from the clamping surfaces, thereby greatly improving reliability of the fluid regulator. To further increase friction at these peripheral regions of the diaphragms, the diaphragms may have serrations near their peripheral edges. Additionally or alternatively, for configurations where the valve stem is rigidly coupled to the diaphragms, the diaphragms may have serrations near their central portions to further increase the friction at the central portions. Other examples described herein include incorporating a gasket near the peripheral edges of the diaphragms to prevent the diaphragms from excessive displacements, which can result in high peak stresses and premature failure of the diaphragms.

Before describing the example fluid regulators mentioned above, a brief description of a known fluid regulator is provided below in connection with FIG. 1. Turning to FIG. 1, a cross-sectional view of a fluid regulator 100 is provided. The fluid regulator 100 includes a valve body 102 coupled to a bonnet 104 with a plurality of fasteners 106, 108 spaced along an exterior edge of the valve body 102 and the bonnet 104 in a conventional manner. A diaphragm 110 is captured between the valve body 102 and the bonnet 104 and separates the space within the valve body 102 and the bonnet 104 into a fluid sensing chamber 112 and an atmospheric pressure chamber 114. Alternatively, the atmospheric chamber 114 may have a non-atmospheric pressure (e.g., for a pressure differential fluid regulator). The diaphragm 110 is convoluted and, thus, has a curved portion 115. For example, the curved portion 115 may have a wave-like cross-sectional shape with a single point of inflection.

A registration hole 116 allows fluid to flow from an outlet 118 to the fluid sensing chamber 112. A diaphragm backing plate 120 is operatively coupled to the diaphragm 110 and a spring 122, which provides a loading force to the backing plate 120. The amount of force provided by the spring 122 can be adjusted by turning an adjustment screw 124, which is threadably coupled to the bonnet 104. In this particular example, a stem plate 125 is fixed to a valve stem 126.

When pressure of the fluid at the outlet 118 decreases, the diaphragm 110 moves towards the valve body 102, counteracting the force of a spring 127, and displacing the valve stem 126, which is fixed to a sealing poppet 128. The corresponding movement of the sealing poppet 128 causes an opening between an inlet 130 and the outlet 118 to increase, thereby reducing the pressure differential between the inlet 130 and the outlet 118.

Figure 2:
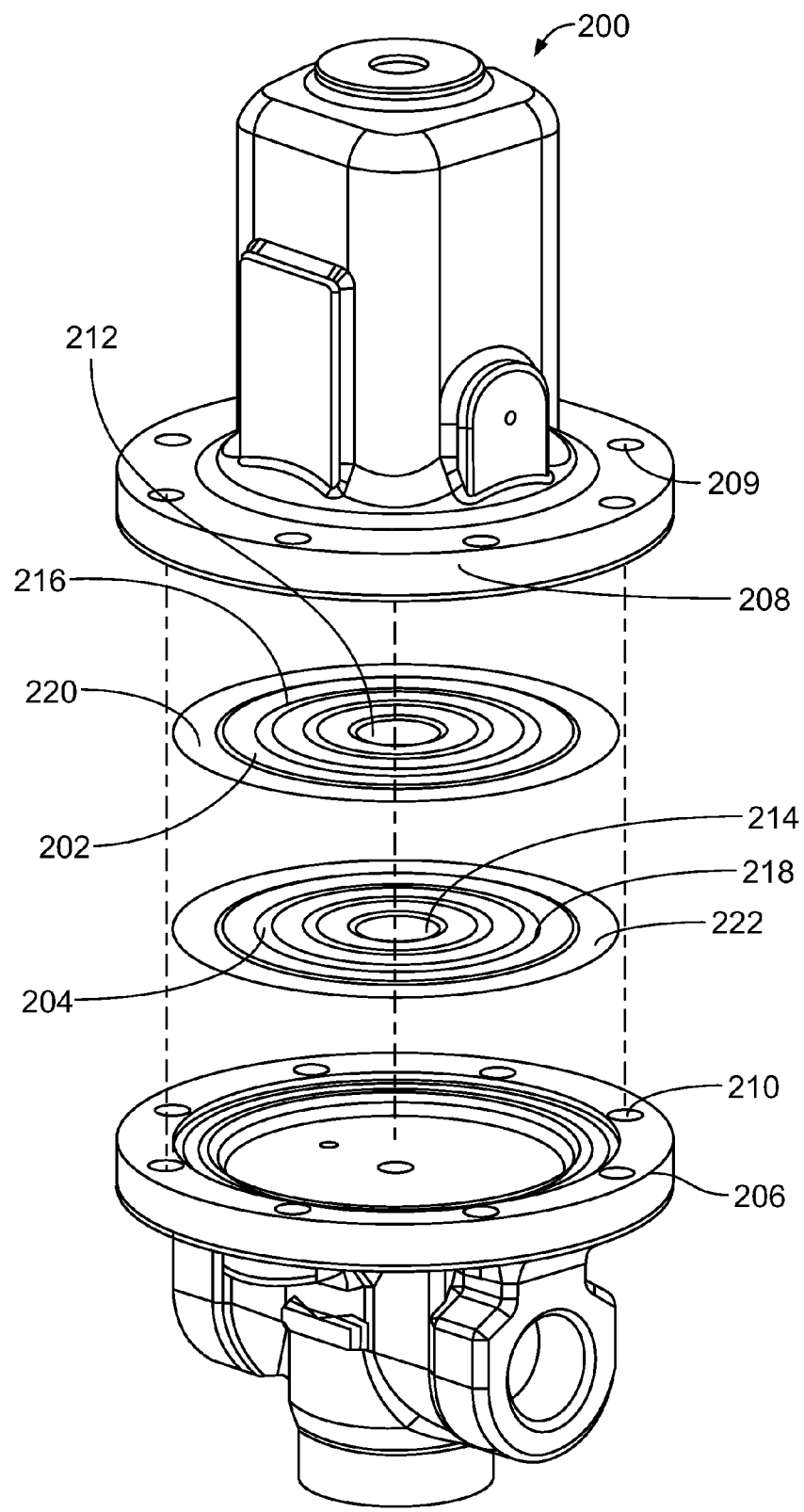
FIG. 2 is an exploded view of an example fluid regulator constructed in accordance with the teachings of this disclosure.

FIG. 2 is an exploded view of an example fluid regulator 200 constructed in accordance with the teachings of this disclosure. As depicted in FIG. 2, diaphragms 202 and 204 are clamped in a stacked configuration between a valve body 206 and a bonnet 208. The valve body 206 and the bonnet 208 are coupled by a plurality of fasteners passing through clearance holes 209 and engaging threaded holes 210. Each of the diaphragms 202, 204 has a corrugated profile to reduce peak stresses encountered within the diaphragms 202, 204 by at least reducing tangential stresses and also providing significantly more surface area to distribute stresses in comparison to a relatively flat profile or a singular curved portion as found in a convoluted diaphragm (e.g., the portion 115 of FIG. 2). Example corrugation profiles or geometries will be illustrated in further detail in connection with FIGS. 5B and 5C.

The diaphragms 202, 204 have respective flat central portions 212, 214, intermediate portions 216, 218 having the aforementioned corrugated profile and peripheral portions 220, 222, which are substantially flat. Arranging the diaphragms 202, 204 in a stacked configuration further reduces peak stresses within the diaphragms 202, 204, thereby improving cycle life of the diaphragms 202, 204 and improving overall reliability of the fluid regulator 200. While the example of FIG. 2 depicts two diaphragms, any other number of diaphragms may be used. Additionally, the diaphragms 202, 204 may be composed of metal, elastomer, and/or any other suitable material(s). The corrugation profile (e.g., dimensions of the height of the corrugations, etc.) may also differ between the diaphragms 202 and 204.

Figure 3:
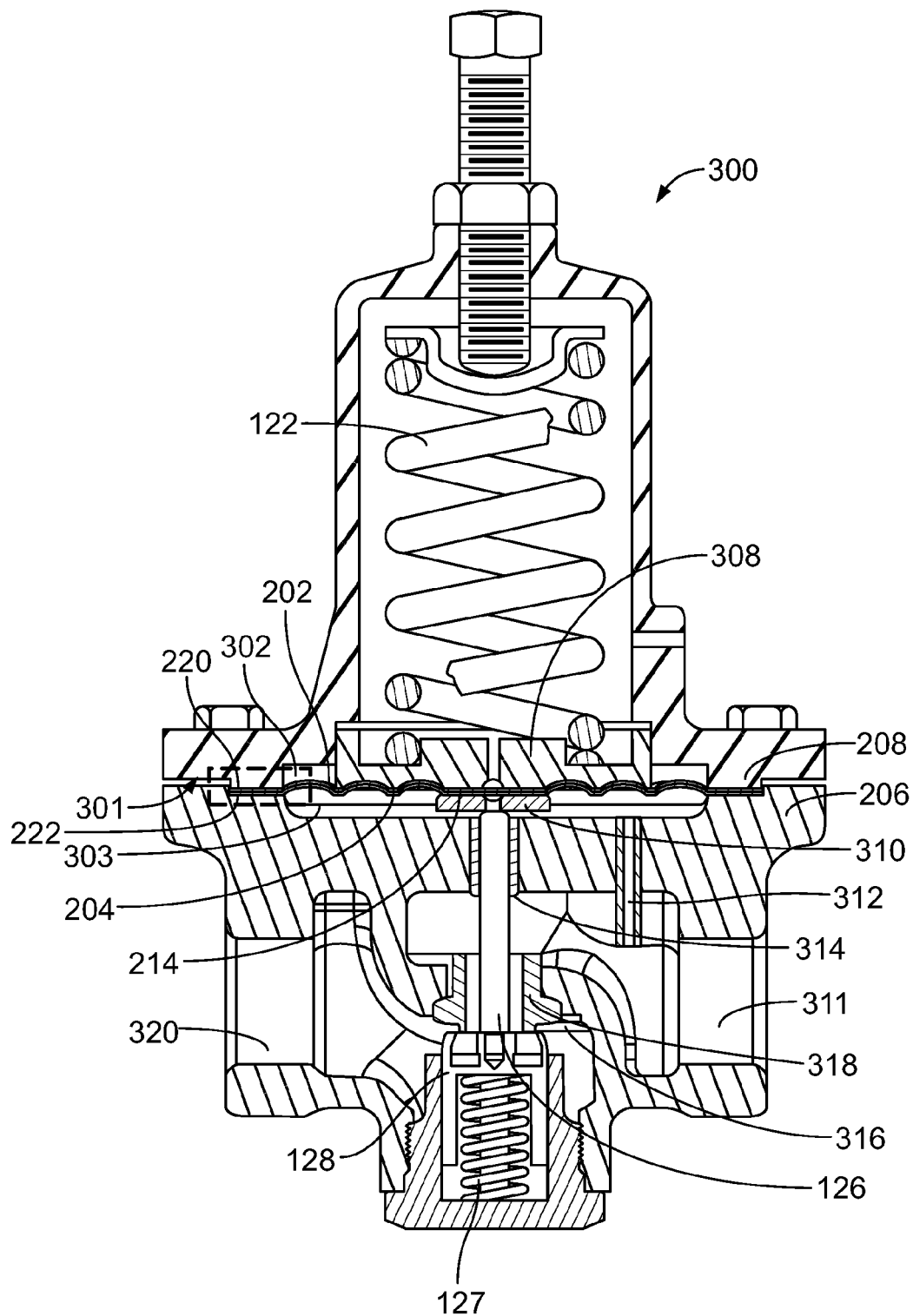
FIG. 3 is a cross-sectional view of the fluid regulator of FIG. 2.

FIG. 3 is a cross-sectional view of the example fluid regulator 200 of FIG. 2. In this example, the diaphragms 202, 204 do not contain central apertures. The valve body 206 and the bonnet 208 clamp and constrain the diaphragms 202, 204 at their peripheral portions 220, 222 via a clamping assembly 301. A first one of the diaphragms 202 is adjacent to an atmospheric chamber 302, and the second diaphragm 204 is displaced by the fluid in a sensing chamber 303. In turn, the second diaphragm 204 pushes a valve stem plate 310 (i.e., a bump connection) which, in turn, displaces the valve stem 126 through movement of its central portion 214 resulting from fluid contact in the fluid sensing chamber 303. Additionally, the first diaphragm 202 may move upward to displace a backing plate 308, thereby counteracting the force of the spring 122, when the second diaphragm 204 displaces upward in response to fluid pressure in the sensing chamber 303.

In some examples, a lubricant may be applied between the diaphragms 202, 204 to substantially improve ease of assembly. Additionally or alternatively, lubricant may be applied between the backing plate 308 and the first diaphragm 202, and between the valve stem plate 310 and the second diaphragm 204 to further improve ease of assembly. The lubricant may be graphite-based for anti-seize applications or any other appropriate lubrication.

Similar to the fluid regulator 100, an outlet 311 is in fluid communication with the sensing chamber 303 through a registration hole 312. As a result, the sensing chamber 303 has the same fluid pressure as the outlet 311. The valve stem 126 moves along an axis of an opening 314 and is fixed to the sealing poppet 128. A chamber 316 contains the sealing poppet 128 and is adjacent to an orifice 318, which allows fluid communication from an inlet 320 to the outlet 311. Displacement of the diaphragm 204 counteracts the force of the spring 127 and causes the valve stem 126 to move, thereby pushing the sealing poppet 128 away from its sealing position. This movement of the sealing poppet 128 changes the size of the opening in the chamber 316 between the inlet 320 and the outlet 311, which alters the fluid flow therethrough.

Figure 4:
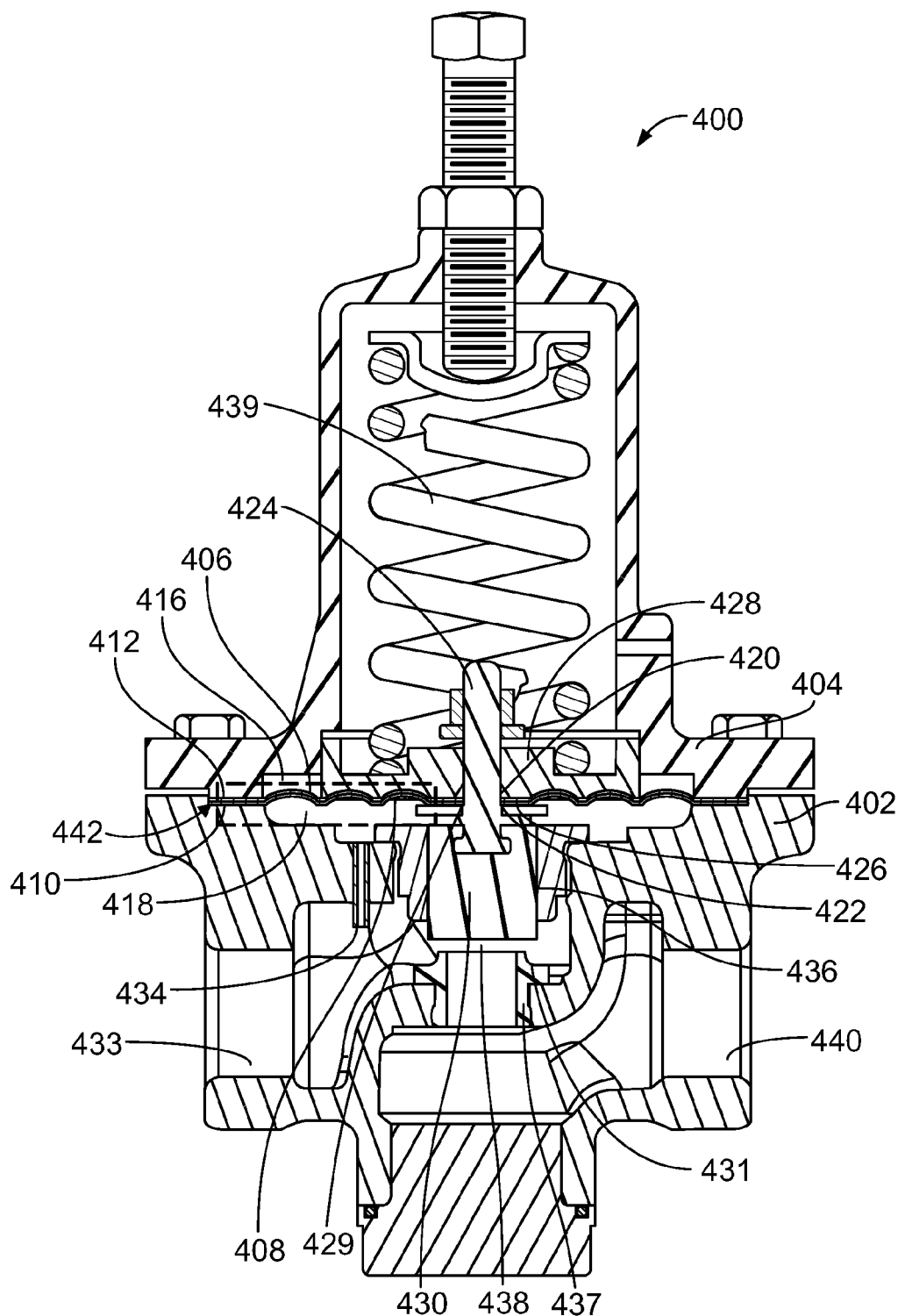
FIG. 4 is a cross-sectional view of another example fluid regulator.

FIG. 4 is a cross-sectional view of another example fluid regulator 400. A valve body 402 and a bonnet 404 clamp and constrain first and second diaphragms 406, 408 at their peripheral portions 410, 412. The diaphragms 406, 408, which are adjacent to an atmospheric chamber 416, are displaced by the fluid in a sensing chamber 418. In this example, the diaphragms 406, 408 have respective central apertures 420, 422. A valve stem 424, which is fixed to a valve stem plate 426 and a backing plate 428, constrains the diaphragms 406, 408 and a gasket 429 between the valve stem plate 426 and the backing plate 428, thereby compressing the gasket 429 and sealing the central apertures 420, 422. The valve stem 424, which may be integral with the valve stem plate 426 and/or the backing plate 428, passes through the central apertures 420, 422 and is also fixed to a valve plug 430. Fixing the valve stem 424 to these components, which may be accomplished with a fastener, a weld or other manner, greatly increases the accuracy of the fluid regulator 400. In operation, the valve stem 424 is displaced by the diaphragms 406, 408 to cause the valve plug 430 to move away from a sealing position 431.

Similar to the fluid regulator 200, in some examples, a lubricant may be applied between the diaphragms 406, 408 to substantially improve ease of assembly. Additionally or alternatively, lubricant may be applied between the backing plate 428 and the first diaphragm 406, and between the valve stem plate 426 and the second diaphragm 408 to further improve ease of assembly. The lubricant may be graphite-based for anti-seize applications or any other appropriate lubrication.

Similar to the fluid regulator 100, an inlet 433 is in fluid communication with the sensing chamber 418 through a registration hole 434. As a result, the sensing chamber 418 has the same fluid pressure as the inlet 433. The valve stem 424 moves along an axis of an aperture 436 and is rigidly fixed to the valve plug 430. A chamber 438 contains the valve plug 430 and is adjacent to an orifice 437, which allows fluid communication from the inlet 433 to an outlet 440. Displacement of the diaphragms 406, 408 towards the bonnet 404 counteracts the force of a spring 439 and causes the valve stem 424 to move, thereby pushing the valve plug 430 away from its sealing position 431. This movement of the valve plug 430 changes the size of the opening in the chamber 438 between the inlet 433 and the outlet 440, which alters the fluid flow therethrough. A center section 442 showing the center constraints of the diaphragms 406, 408 is discussed in detail below in connection with FIG. 7.

FIG. 5A is a cross-sectional view of the corrugated diaphragms 202, 204 of FIGS. 2 and 3. The diaphragms 406, 408 (and any other examples below) may also describe the features in connection with FIGS. 5B, 5C, 5F, and 5G. The central portions 212, 214 and the peripheral portions 220, 222 are relatively flat in comparison to the intermediate portions 216, 218, which have a corrugated annular profile region 502. In this particular example, the corrugated profile region 502 is depicted as having multiple curves, contours and/or points of inflection.

FIG. 5B is an enlarged view of the corrugated profile region 502, which flexes and bends during operation of the fluid regulator 200. In the orientation of FIG. 5B, the corrugated or non-planar profile region 502 has convolutions with a plurality of convex portions 504a, 504b, 504c and concave portions 506a, 506b. The concave portions 506a, 506b may range in height above and below relatively flat portions 508, 510. While this example depicts three convex portions 504a, 504b and 504c, any other number of convex portions or convolutions may be used. Each of the convex portions 504a, 504b, 504c and the concave portions 506a, 506b may have different radii of curvature along the corrugated profile 502. For example, the radius of the convex portion 504a may differ from the convex portion 504b. Similarly, the radii of curvature of the convex portions 504a, 504b, 504c may differ from each other and/or the concave portions 506a, 506b.

FIG. 5C depicts an alternative non-planar or corrugated profile 511 having relatively sharp edges or points of inflection. In contrast to the corrugated profile region 502, the corrugated profile 511 has numerous substantially linear portions 512, which are formed by relatively sharp edges 514. This profile may be made from formed sheet metal or any suitable material or process.

FIG. 5D depicts a cross-sectional view of the diaphragms 406, 408 of FIG. 4, which contain the apertures 420, 422 in a central portion 516. As discussed above, the central apertures 420, 422 may be used to couple the diaphragms 406, 408 to the backing plate 428 and the valve stem plate 426. The diaphragms 406, 408 have an intermediate portion 518 in addition to the aforementioned peripheral portions 410, 412.

FIG. 5E is a cross-sectional view of an example diaphragm 522 that has a plurality of apertures 524, 526, which may be used to operatively couple any plurality of the diaphragms 522 to the backing plate 428 and the valve stem plate 426 via the valve stem 424. The diaphragm 522 has a central portion 527, an intermediate portion 528, and a peripheral portion 530.

FIG. 5F shows an enlarged view of the peripheral portion 530 of the diaphragm 522 of FIG. 5E. In this example, the peripheral portion 530 has serrations 532 to increase friction.

FIG. 5G shows an enlarged view of the center portion 527 of FIG. 5E. In this example, the central portion 527 has serrations 534 to increase friction. A more detailed description of the serrations 532, 534 and their relationship to friction is provided below in conjunction with FIGS. 6A, 6B, and 7. The diaphragms 202, 204, 406, 408, 522 used in the fluid regulators 200, 400 may have any combination of apertures, serrations, etc.

Figure 6A:
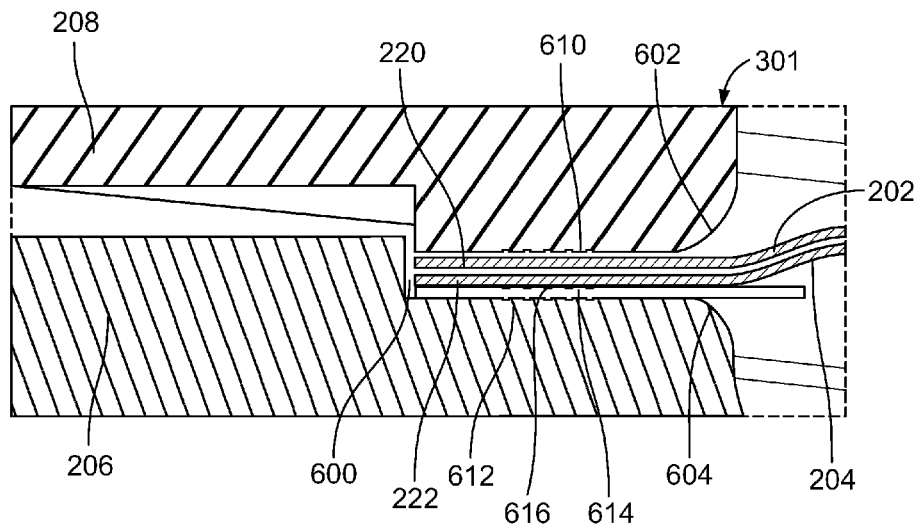
FIG. 6A is an enlarged cross-sectional view of the clamping assembly of the example fluid regulator of FIGS. 2 and 3.

FIG. 6A is an enlarged cross-sectional view of the clamping assembly 301 of the fluid regulator 200 of FIG. 3. The bonnet 208 and the valve body 206, as described above, are coupled together to clamp the diaphragms 202, 204. A recess 600 of the valve body 206 holds the peripheral regions 220, 222 of the diaphragms 202, 204. The bonnet 208 and the valve body 206 may have contoured (e.g., radiused) annular edges 602, 604 to prevent the diaphragms 202, 204 from experiencing localized stress concentrations as the peripheral regions 220, 222 of the diaphragms 202, 204 deflect and contact the bonnet 208 or the valve body 206.

Alternatively or additionally, surfaces 610, 612 may have serrations to increase friction between the diaphragms 202, 204 and the bonnet 208 and valve body 206 to prevent the peripheral regions 220, 222 of the diaphragms 202, 204 from being pulled out of the clamping assembly 301. The diaphragms 202, 204 may also have serrations in their peripheral regions 220, 222 (as shown in FIG. 5F) to further increase friction at the clamping joint.

A gasket 614 may be used to prevent the diaphragms 202, 204 from encountering excessive deflections at their peripheral regions 220, 222 and, thus, provide support and reduce overall stresses of the diaphragms 202, 204. Also, the gasket 614 provides additional surface area for the diaphragms 202, 204 to distribute stresses and further reduce overall peak stresses of the diaphragms 202, 204. Although the gasket 614 is depicted as being placed adjacent to the valve body 206, the gasket 614 may alternatively or additionally (i.e., multiple gaskets) be placed adjacent to the bonnet 208. The gasket 614 may have serrations 616 on the surface in contact with the diaphragms 202, 204 and may be made of composite, elastomer, plastic, metal or any other suitable material. Although only the gaskets 202, 204 are shown, the features described in FIG. 6A may be applied to the gaskets 406, 408, 522.

Figure 6B:
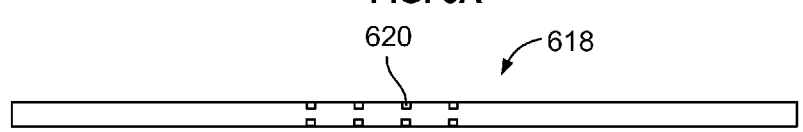
FIG. 6B is a cross-sectional view of an example gasket.

FIG. 6B shows a gasket 618 with serrations 620 on both sides. Although serrations are depicted in FIG. 6A as being on a single side of the gasket 614, such serrations may, for example, be used on both sides of the gasket 618 if the surface 612 does not have serrations. Likewise, if the surface 610 does not contain serrations, the gasket 618 could be placed adjacent to the surface 610.

Figure 7:
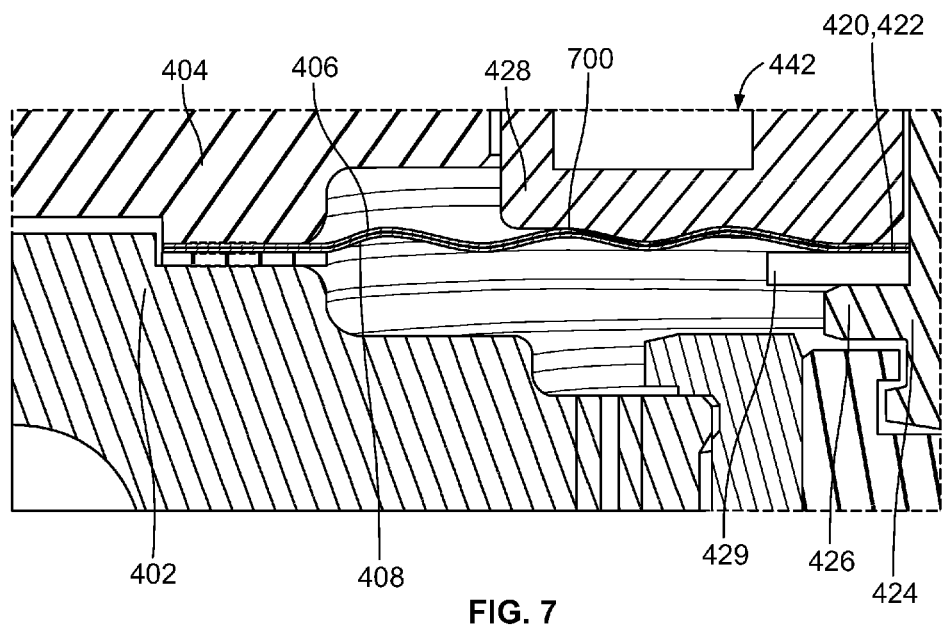
FIG. 7 is an enlarged view of the center portion of the example fluid regulator of FIG. 4.

FIG. 7 is an enlarged cross-sectional view of the center section 442 of the fluid regulator 400 of FIG. 4. The diaphragms 406, 408 are clamped between the valve body 402 and the bonnet 404. The backing plate 428 may include contours 700 to match the corrugation profile of the diaphragms 406, 408. The diaphragms 406, 408 and the gasket 429 are constrained between the backing plate 428 and the valve stem plate 426. In this specific example, the valve stem plate 426 is integral with the valve stem 424. The gasket 429 is compressed to maintain a seal through the apertures 420, 422. This compression is a result of the distance between the valve stem plate 426 and the backing plate 428 compressing the gasket 429 and the diaphragms 406, 408 via an interference fit (i.e., the combined thicknesses of the gasket 429 and the diaphragms 406, 408 being greater than the distance between the backing plate 428 and the valve stem plate 426). Although, diaphragms 406, 408 are shown in FIG. 7, such a clamping scheme may also apply to stacking a plurality of the diaphragms 522.

The diaphragms 406, 408, 522 may also have serrations in their central portions 516, 527 (as shown in FIG. 5G) to increase friction between the diaphragms 406, 408, 522 and the backing plate 428 and/or the valve stem plate 426. Increasing friction at these locations prevents the diaphragms 406, 408, 522 from being pulled out of the center constraints near the centers of the diaphragms 406, 408, 522, thereby improving reliability (e.g., cycle life) of the fluid regulator.

Figure 8:
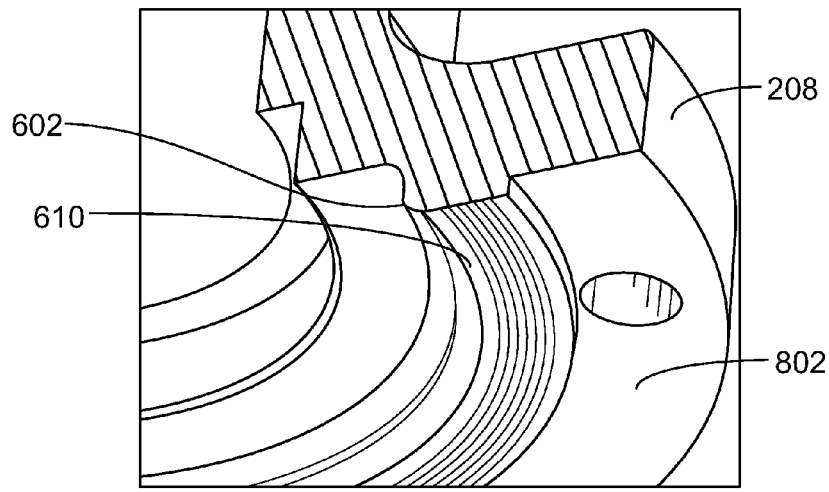
FIG. 8 is an enlarged cross-sectional view of the example bonnet of the fluid regulators of FIGS. 2, 3 and 6A.
Figure 9:
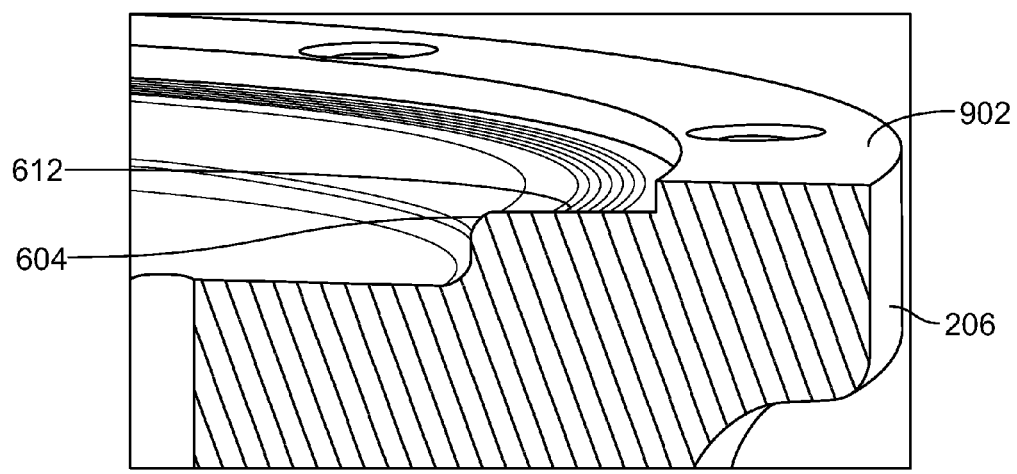
FIG. 9 is an enlarged cross-sectional view of the example valve body of the fluid regulators of FIGS. 2, 3 and 6A.

FIGS. 8 and 9 are enlarged cross-sectional views of the bonnet 208 and the valve body 206 of FIGS. 2, 3 and 6A. The bonnet 208 and the valve body 206 are coupled together at surfaces 802, 902 with a plurality of fasteners as discussed above. The peripheral regions 220, 222 of the gaskets 202, 204 are stacked and clamped between the surfaces 610, 612. In this example, the bonnet 208 and the valve body 206 have serrations at the surfaces 610, 612 to frictionally engage the diaphragms 202, 204. The surfaces 610, 612 provide a substantially tight seal when the diaphragms 202, 204 are clamped. The contoured annular edges 602, 604 allow the diaphragms 202, 204 to roll or flex about the annular edges 602, 604 without encountering the highly localized stress concentrations that would otherwise be experienced if they instead contacted relatively sharp edges. These example configurations and variations may also apply to the diaphragms 406, 408, 522, the valve body 402, the bonnet 404, etc.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
   a valve body having an inlet and an outlet to allow fluid to flow therethrough;
   a backing plate disposed within a bonnet and operatively coupled to the valve body; and
   first and second diaphragms, each having a corrugated profile and in a stacked configuration, wherein first corrugations of the first diaphragm are to contact second corrugations of the second diaphragm such that the first corrugations matably receive the second corrugations, wherein the first and second corrugations include a sawtooth-shaped pattern, wherein the first diaphragm and the second diaphragm are to move together, the diaphragms operatively coupled to the backing plate, each of the diaphragms is clamped between the valve body and the bonnet proximate a peripheral edge of the diaphragm.

2. The apparatus as defined in claim 1, wherein each of the diaphragms has a central aperture to rigidly couple diaphragms to a stem fixed to the backing plate.

3. The apparatus as defined in claim 1, wherein each of the diaphragms has serrations proximate the peripheral edge of the diaphragm to increase friction between the diaphragms, the valve body and the bonnet.

4. The apparatus as defined in claim 1, wherein the valve body or the bonnet has serrations to increase friction between the first or the second diaphragm and the valve body or the bonnet.

5. The apparatus as defined in claim 1, wherein the valve body or the bonnet comprises a contoured annular edge proximate the peripheral edges of the diaphragms.

6. The apparatus as defined in claim 1, wherein the first and second diaphragms comprise flat portions proximate their respective center portions, and wherein the flat portions of the first and second diaphragms contact one another.

7. The apparatus as defined in claim 1, further comprising a lubricant applied between the first and second diaphragms.

8. The apparatus as defined in claim 1, wherein each of the diaphragms has a central aperture to rigidly couple the diaphragms to the backing plate.

9. The apparatus as defined in claim 8, further comprising a second gasket proximate the central aperture of the diaphragms.

10. The apparatus as defined in claim 1, wherein the valve body or the bonnet holds a gasket proximate the peripheral edges of the diaphragms, an end of the gasket to extend past the peripheral edges of the diaphragms into a sensing chamber.

11. The apparatus as defined in claim 10, wherein the gasket has first serrations on a first surface adjacent the valve body and second serrations of a second surface adjacent the first or the second diaphragm.

12. The apparatus as defined in claim 1, wherein the backing plate is operatively coupled to a tension loading mechanism.

13. The apparatus as defined in claim 12, wherein the backing plate includes a recess to receive a spring of the tension loading mechanism.

14. An apparatus comprising:
   a valve body having an inlet and an outlet allowing fluid to flow therethrough;
   a fluid chamber disposed within the valve body;
   a plurality of diaphragms in a stacked configuration adjacent to the fluid chamber, each diaphragm of the plurality of diaphragms having a corrugated profile with corrugations having a sawtooth-shaped pattern, wherein first corrugations of a first diaphragm are to contact second corrugations of a second diaphragm such that the first corrugations matably receive the second corrugations, wherein the diaphragms are to move together, wherein the first diaphragm of the plurality of diaphragms is operatively coupled to a backing plate, and the second diaphragm of the plurality of diaphragms is operatively coupled to a valve stem, the first and second diaphragms to cause the backing plate to displace relative to the valve body in response to a pressure; and a bonnet containing the backing plate, wherein the diaphragms are clamped between the valve body and the bonnet.

15. The apparatus as defined in claim 14, wherein each of the diaphragms has one or more apertures proximate a center of the diaphragm to rigidly couple the diaphragm to the backing plate.

16. The apparatus as defined in claim 14, wherein each of the diaphragms has serrations proximate a peripheral edge or a center of the diaphragm.

17. The apparatus as defined in claim 14, wherein the valve body or the bonnet has serrations.

18. The apparatus as defined in claim 14, wherein the valve body or the bonnet comprises an annular recess to hold peripheral edges of the diaphragms.

19. The apparatus as defined in claim 14, wherein the valve body or the bonnet comprises a contoured annular edge proximate peripheral edges of the diaphragms.

20. The apparatus as defined in claim 14, further comprising a gasket proximate peripheral edges of the diaphragms.

21. The apparatus as defined in claim 14, wherein the diaphragms comprise flat portions proximate their center portions, and wherein the flat portions of the first and second diaphragms contact one another.

22. The apparatus as defined in claim 14, wherein corrugations of each diaphragm are aligned to corrugations of an adjacent diaphragm in the stacked configuration.

23. An apparatus comprising:

a plurality of diaphragms, each diaphragm having a corrugated profile with corrugations having a sawtooth-shaped pattern and in a stacked configuration, wherein corrugations of each diaphragm correspond to corrugations of adjacent diaphragms such that the corrugations of each diaphragm matably receive the corrugations of respective adjacent diaphragms, wherein the diaphragms are constrained at their peripheral edges and adjacent to a fluid chamber, and wherein adjacent diaphragms of the diaphragms are to contact one another at least at their central portions, and the adjacent diaphragms are to move together; and a valve stem operatively coupled to the diaphragms through central apertures of the diaphragms.

24. The apparatus as defined in claim 23, wherein the valve stem is rigidly fixed to the diaphragms via the central apertures.

25. The apparatus as defined in claim 23, wherein each of the diaphragms has serrations proximate the peripheral edge or a center of the diaphragm.

26. The apparatus as defined in claim 23, further comprising a gasket proximate to the peripheral edges of the diaphragms.

27. The apparatus as defined in claim 23, wherein the diaphragms are constrained by serrated surfaces.

28. The apparatus as defined in claim 23, wherein the diaphragms comprise flat portions proximate their center portions, and wherein the flat portions of a first diaphragm and a second diaphragm contact one another.

* * * * *